US 6,364,402 B1

(12) United States Patent
Sasaki (10) Patent No.: US 6,364,402 B1
(45) Date of Patent: Apr. 2, 2002

(54) VEHICULAR HOOD APPARATUS

(75) Inventor: Sakae Sasaki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/613,125

(22) Filed: Jul. 10, 2000

(30) Foreign Application Priority Data

Jul. 19, 1999 (JP) .......................................... 11-204998

(51) Int. Cl.⁷ .............................................. B62D 25/12
(52) U.S. Cl. ................................... 296/194; 180/69.21
(58) Field of Search .......................... 180/69.2, 69.21, 180/274, 281; 296/194, 76, 189

(56) References Cited

U.S. PATENT DOCUMENTS

| 3,709,316 A | 1/1973 | Glance |
| 4,249,632 A | 2/1981 | Lucchini et al. |
| 4,572,314 A | 2/1986 | Anguera |
| 4,753,475 A | 6/1988 | Mochida |
| 5,197,560 A | 3/1993 | Oda et al. |
| 5,337,852 A | 8/1994 | Kastner |
| 6,182,782 B1 | 2/2001 | Matsuura et al. |
| 6,217,108 B1 | 4/2001 | Sasaki |

FOREIGN PATENT DOCUMENTS

| DE | 2711338 | 9/1978 |
| DE | 2757238 | 6/1979 |
| DE | 2841092 | 4/1980 |
| DE | 28 41 315 | 4/1980 |
| DE | 2841315 | 10/1980 |
| DE | 2947202 | 5/1981 |
| DE | 19721565 | 4/1997 |
| DE | 197 21 565 | 12/1997 |
| DE | 19712961 | 1/1998 |
| DE | 197 12 961 | 10/1998 |
| DE | 199 22 454 | 11/2000 |
| DE | 19922454 | 11/2000 |
| JP | 9-315266 | 5/1996 |
| JP | 10-258774 | 3/1997 |
| JP | 11-34925 | 7/1997 |
| JP | 09315266 | 12/1997 |
| JP | 11034925 | 2/1999 |
| JP | 11-115680 | 4/1999 |
| JP | 2000-264146 | 9/2000 |

OTHER PUBLICATIONS

German Search Report,, Feb. 13, 2001, with english translation.
09/619,323: Translation of German Search Report, and German Search Report, 8 pages, Feb. 13, 2001.
09/613,125: Translation of German Search Report, and German Search Report, Feb. 13, 2001.
Specification of Application No. 09/610,187.
Specification of Application No. 09/611,930.
Specification of Application No. 09/611,249.
Specification of Application No. 09/619,323.

Primary Examiner—Joseph D. Pape
(74) Attorney, Agent, or Firm—Merchant & Gould P.C.

(57) ABSTRACT

A vehicular hood apparatus includes a hood provided on a front part of a vehicle, and an actuator. The hood is lifted a predetermined amount when the vehicle hits an obstacle. The actuator includes a piston rod for pushing the hood upwardly, and a rod retaining means. When the piston rod arrives in an uppermost position, the rod retaining means holds the piston rod in the uppermost position.

4 Claims, 10 Drawing Sheets

VEHICULAR HOOD APPARATUS

BACKGROUND OF THE INVENTION

1. Field of the Invention

The present invention relates to a vehicular hood apparatus including a hood sufficiently deformable in a lifted position to absorb an impact of an obstacle thereon.

2. Description of the Related Art

Known vehicular hood apparatuses including a hood are provided on a vehicle. Such a hood is lifted upwardly and then held in a lifted position when the vehicle hits an obstacle. The lifted hood provides increased possible amount of downward deformation thereof. That is, the hood held in a lifted position can be deformed more downwardly. Thus, when the vehicle hits the obstacle and the obstacle is thereby thrown onto the hood, the hood can greatly absorb an impact of the obstacle thereon. One example of such vehicular hood apparatuses is known from Japanese Patent Laid-Open HEI 9-315266 entitled "VEHICULAR HOOD APPARATUS".

Figure 13:
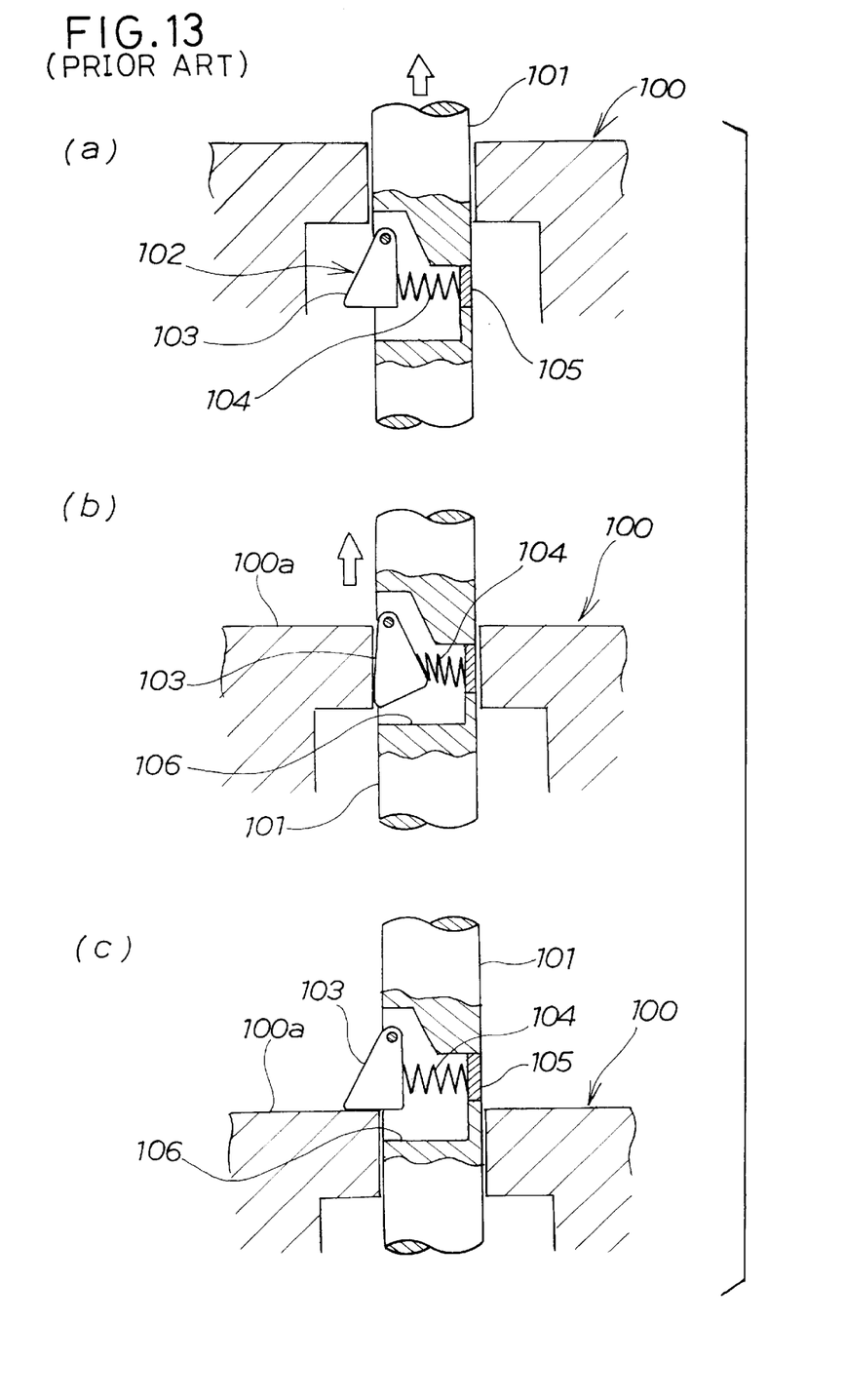
FIGS. 13(a) to 13(c) show how a conventional vehicular hood apparatus is operated.

FIGS. 13(a) to 13(c) hereof show the vehicular hood apparatus disclosed in the above-mentioned publication.

As shown in FIG. 13(a), a rod 101 of an actuator 100 of the apparatus provided on a vehicle commences to rise when the vehicle hits an obstacle, as indicated by an arrow. The rod 101 has a recess 106 formed therein. Provided in the recess 106 is a rod retaining means 102 including a stopper piece 103, a compression spring 104, and a retaining piece 105. The spring 104 urges the stopper piece 103 in such a manner that the stopper piece 103 projects from the rod 101.

As shown in FIG. 13(b), the rod 101 further rises in a direction indicated by an arrow to thereby bring the stopper piece 103 into abutment on a housing 100a of the actuator 100. The stopper piece 103 is then moved into the recess 106.

As shown in FIG. 13(c), the rod 101 still further rises to an uppermost position, whereupon a hood (not shown) of the apparatus is lifted a given amount. The stopper piece 103 is then moved beyond the housing 100a of the actuator 100 to thereby project from the rod 101.

The stopper piece 103 abuts on an upper surface of the housing 100a to thereby hold the rod 101 in the uppermost position. Consequently, the hood is held in a lifted position.

However, the rod retaining means 102 including the stopper piece 103, the compression spring 104, and the retaining piece 105 should be mounted in the recess 106 of the rod 101, and thus the rod 101 becomes inevitably complicated in construction.

Further, since the rod 101 is relatively slim, mounting the rod retaining means 102 in the recess 106 requires a long time. Furthermore, forming the recess 106 in the slim rod 101 also requires a long time.

As a result, the actuator becomes undesirably expensive.

SUMMARY OF THE INVENTION

An object of the present invention is to provide a vehicular hood apparatus including a less costly actuator with a rod retaining means.

According to a first aspect of the present invention, there is provided a vehicular hood apparatus comprising a hood provided on a front part of a vehicle, and an actuator, wherein the actuator lifts the hood a predetermined amount when the vehicle hits an obstacle, the actuator including a rod for pushing the hood upwardly, and a rod retaining means functioning as a compression spring positioned below the rod, the compression spring serving to hold the rod in an uppermost position when the rod arrives in the uppermost position.

The actuator includes the rod retaining means for holding the rod in the uppermost position. The rod retaining means functions as a compression spring of simple construction. Therefore, mounting the rod retaining means to the actuator can be readily effected without requiring a long time. As a result, the cost of the actuator having the rod retaining means can be reduced.

According to a second aspect of the present invention, there is provided a vehicular hood apparatus comprising a hood provided on a front part of a vehicle, and an actuator, wherein the actuator lifts the hood a predetermined amount when the vehicle hits an obstacle, the actuator including a rod for pushing the hood upwardly, and a rod retaining means functioning as a gas supplying section, the gas supplying section serving to supply a space formed below the rod with a gas having a high pressure to thereby hold the rod in an uppermost position when the rod arrives in the uppermost position.

The actuator includes the rod retaining means for holding the rod in the uppermost position. The rod retaining means functions as the gas supplying section. The high pressure of the gas supplied from the gas supplying section acts to hold the rod in the uppermost position. The gas supplying section is connected to the actuator through a flow path portion thereof. This eliminates the need to mount the rod retaining means inside the actuator. Therefore, mounting the rod retaining means to the actuator can be easily effected without requiring a long time. As a result, the cost of the actuator having the rod retaining means can be reduced.

According to a third aspect of the present invention, there is provided a vehicular hood apparatus comprising a hood provided on a front part of a vehicle, and an actuator, wherein the actuator lifts the hood a predetermined amount when the vehicle hits an obstacle, the actuator including a rod for pushing the hood upwardly, and a rod retaining means having a lock pin, the rod forming therein a recessed portion, the lock pin being disposed to be fitted into the recessed portion so as to hold the rod in an uppermost position when the rod arrives in the uppermost position.

The actuator includes the rod retaining means for holding the rod in the uppermost position. The rod forms therein the recessed portion while the lock pin to be fitted into the recessed portion is mounted in the housing of the actuator. It is therefore unnecessary for the lock pin to be mounted in the relatively slim rod. Consequently, the mounting the lock pin does not require a long time. As a result, the cost of the actuator having the rod retaining means can be reduced.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENT

The following description is merely exemplary in nature and is in no way intended to limit the invention or its application or uses.

Figure 1:
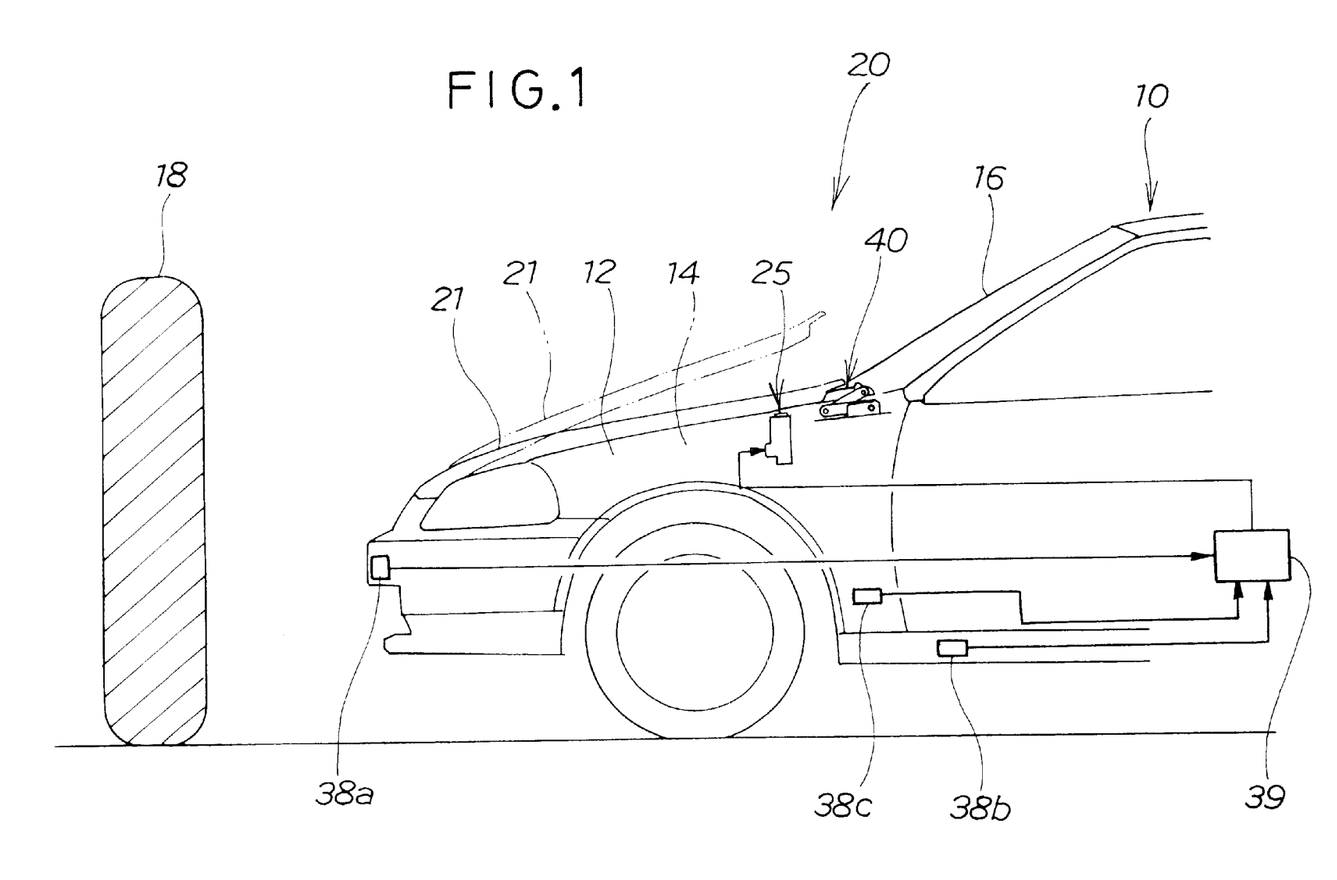
FIG. 1 shows in side elevation a vehicle on which a vehicular hood apparatus according to any one of first to third embodiments of the present invention is provided.

In FIG. 1, there is shown a vehicle 10 on which a vehicular hood apparatus 20 according to the present invention is mounted. As shown in this figure, the vehicle 10 includes front fenders 12, 12 (only one shown) rightwardly and leftwardly thereof. The front fenders 12, 12 form an engine room 14 therebetween. Disposed at an upper part of the engine room 14 and forwardly of a windshield 16 of the vehicle 10 is the vehicular hood apparatus 20 for absorbing an impact of an obstacle 18 on a hood 21, positioned at a front part of the windshield 16, when the vehicle 10 hits the obstacle 18 and the obstacle 18 is thereby thrown onto the hood 21.

The apparatus 20 is operated to lift the hood 21 to a lifted position, shown in a phantom line, and then hold the hood 21 in the lifted position.

Discussion will be made as to the vehicular hood apparatus 20.

The apparatus 20 includes the hood 21 for closing an opening formed at the upper part of the engine room 14, right and left actuators 25 (only one shown) for pushing upwardly right and left rear end portions of the hood 21 so as to lift the hood 21 to the lifted position, a bumper sensor 38a, a floor sensor 38b, a vehicle speed sensor 38c, a control section 39, and right and left link mechanisms 40 provided rightwardly and leftwardly of the rear end portions of the hood 21. When the vehicle 10 hits the obstacle 18, the bumper sensor 38a, the floor sensor 38b, and the vehicle speed sensor 38c detect the hitting of the vehicle 10 and then provide the control section 39 with detecting signals as set forth later. On the basis of the detecting signals from the sensors 38a, 38b, 38c, the control section 39 provides the actuator 25 with a drive signal explained later. The link mechanism 40 provides a limited level of the hood 21 lifted by the actuator 25.

The hood 21 pivots on the rear end portion thereof serving as a fulcrum to thereby open the engine room 14. The engine room 14 thus opened can be repaired and checked. The hood 21 includes a hood lock (not shown) mounted at a front part thereof. With the hood lock, the hood 21 is locked on a vehicle body frame 17.

The right and left actuators 25, 25 are identical in construction to each other. Similarly, the right link mechanism has the same construction as the left link mechanism. Thus, the respective left ones of the actuators 25 and the link mechanisms 40 are discussed hereinafter and the descriptions of the right ones are omitted.

Figure 2:
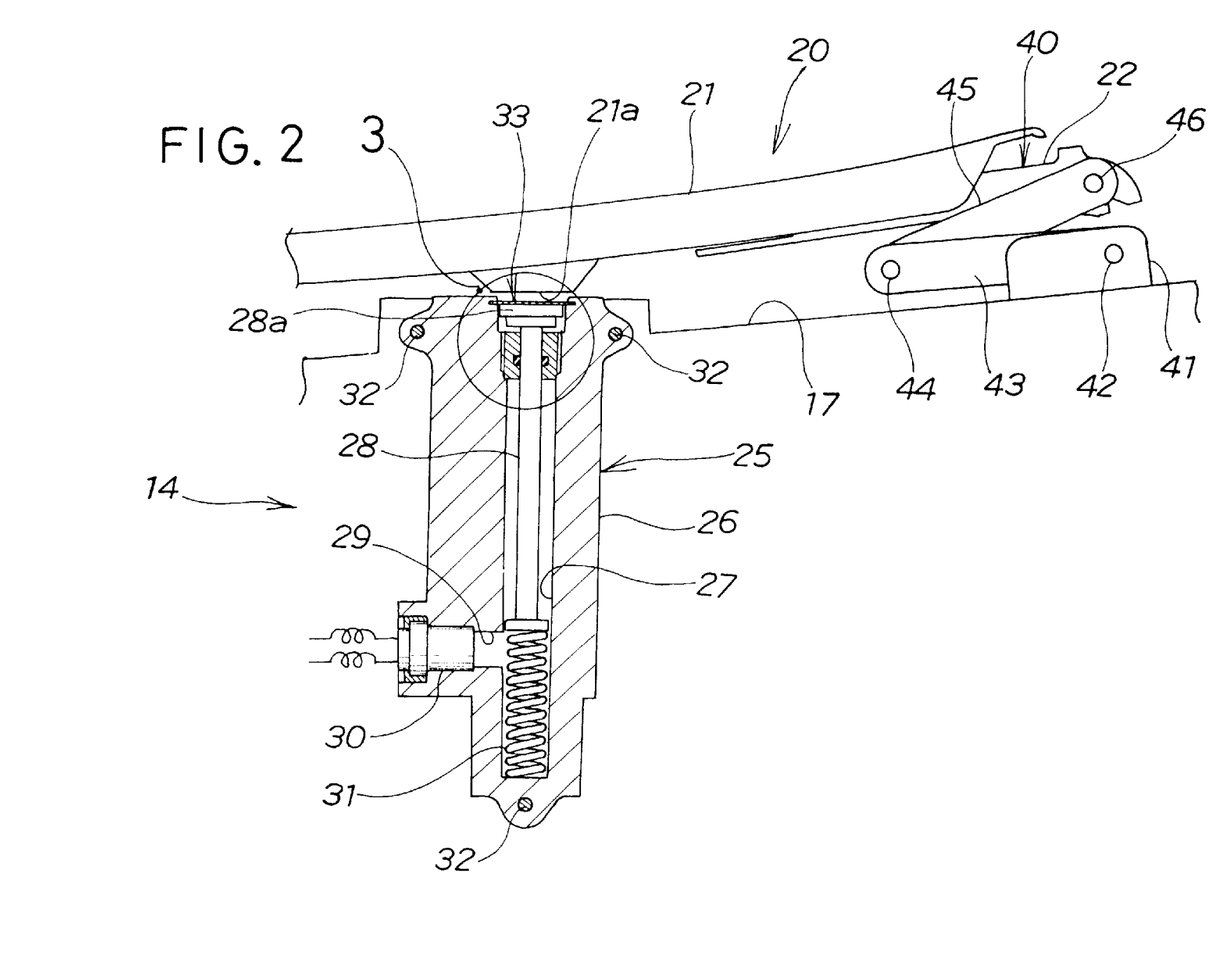
FIG. 2 shows in cross-section an actuator and in side elevation a link mechanism of a vehicular hood apparatus according to a first embodiment of the present invention.

Turning to FIG. 2, the actuator 25 includes an upwardly opened housing 26. The housing 26 forms therein a vertical cylinder portion 27 and a communication aperture 29 communicated with the cylinder portion 27. The actuator 25 includes a rod 28 (hereinafter referred to as "piston rod") for pushing upwardly the hood 21. The piston rod 28 is reciprocally movably disposed in the cylinder portion 27. The actuator 25 has an inflator 30 disposed in the communication aperture 29. The actuator 25 also includes a rod retaining means 31 for holding the piston rod 28 in an uppermost position (shown in FIG. 6) when the piston rod arrives in the uppermost position. Mounted at an upper end portion of the cylinder portion 27 is a lock means 33 for depressing and retaining the piston rod 28 within cylinder portion 27. The housing 26 is attached to the vehicle body frame 17 through bolts 32.

The piston rod 28 has an upper end portion 28a thereof facing towards a projecting portion 21a of the hood 21.

The rod retaining means 31 disposed within the cylinder portion 27 is positioned below a lower end portion of the piston rod 28.

Since the rod retaining means 31 functions as a compression spring of simple structure, mounting the rod retaining means 31 in the housing 26 of the actuator 25 can be readily effected without requiring a long time.

The rod retaining means 31 of the actuator 25 of the apparatus 20 in the first embodiment of the present invention is hereinafter referred to as "compression spring 31".

Figure 6:
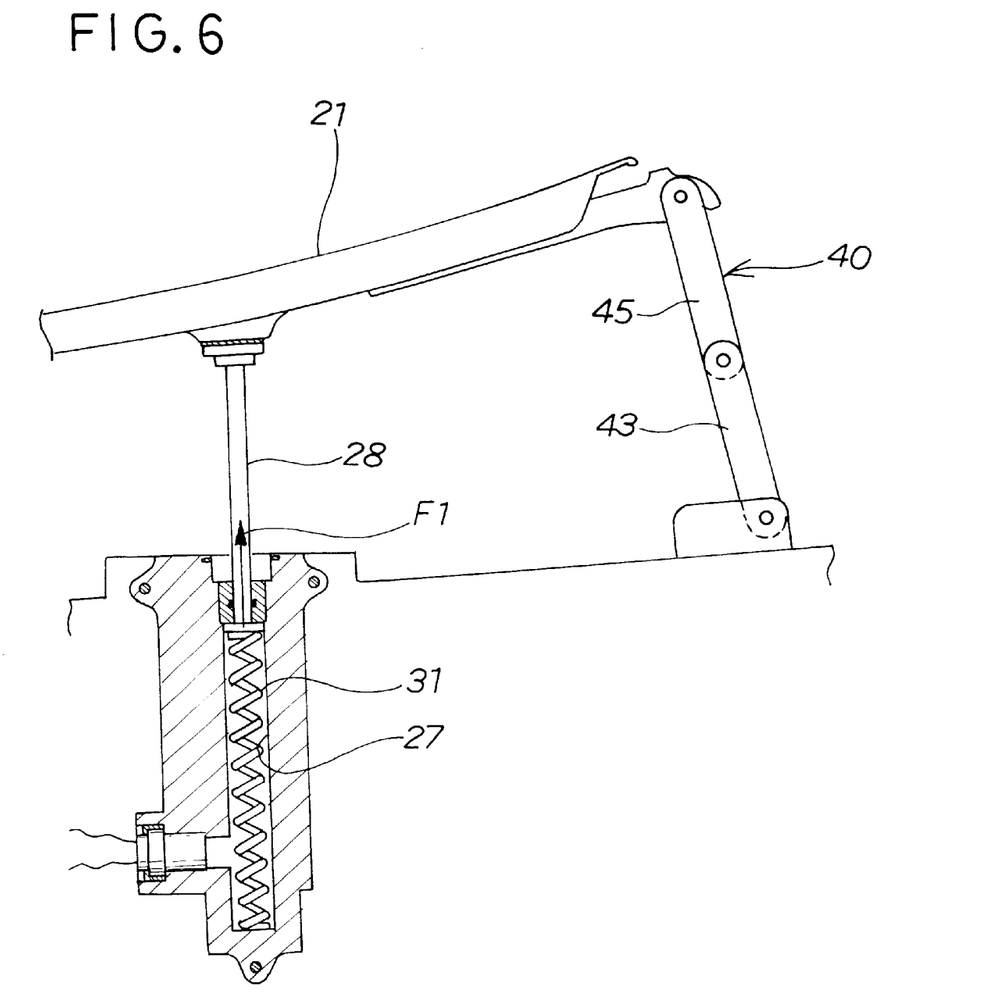
FIG. 6 is a view in which the rod of the actuator shown in FIG. 2 is held in an uppermost position.

The link mechanism 40 is interposed between the vehicle body frame 17 and the hood 21. The link mechanism 40 is extended and contracted in correspondence to upward and downward motions of the hood 21. When the hood 21 is closed as shown in FIG. 2, the link mechanism 40 is in a contracted position. On the other hand, when the hood 21 is lifted a predetermined amount as shown in FIG. 6, the link mechanism 40 is brought to an extended position. The link mechanism 40 provides the limited level of the lifted hood 21.

The link mechanism 40 includes a bracket 41 mounted on the frame 17, a lower link 43 attached to the bracket 41 through a lower pin 42 on which the lower link 43 pivots, an upper link 45 attached to an upper end portion of the lower link 43 through a connecting pin 44 on which the upper link 45 pivots, and a hood arm 22 attached to an upper end portion of the upper link 45 through an upper pin 46 on which the hood arm 22 pivots. When the link mechanism 40 is in the contracted position, the lower and upper links 43, 45 are disposed in the form of a dogleg, as shown in FIG. 2. The hood arm 22 is mounted to the hood 21.

The link mechanism 40 is normally locked in the contracted position. However, when the vehicle 10 hits the obstacle 18, the link mechanism 40 is unlocked and then extended.

The hood 21 pivots on the upper pin 46 to open the engine room 14, whereby the engine room can be repaired or checked.

Figure 3:
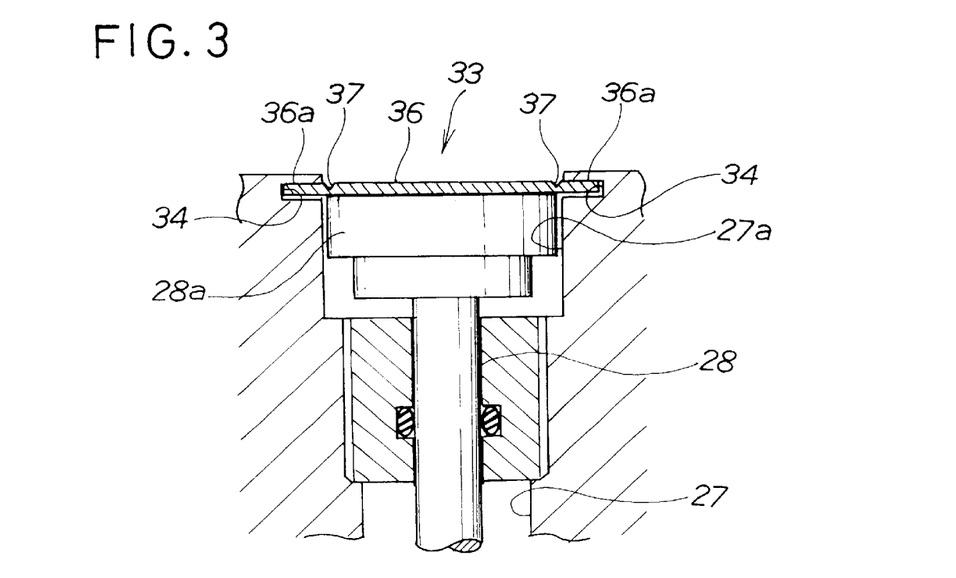
FIG. 3 shows on an enlarged scale a portion encircled by a circle 3.

With reference to FIG. 3, the lock means 33 has lock grooves 34, 34 formed in an upper end portion 27a of the cylinder portion 27. Mounted in these lock grooves 34, 34 are opposite end portions 36a, 36a of a stopper piece 36. The thus arranged stopper piece 36 retains the piston rod 28 within the cylinder portion 27 while holding the spring 31 in a compressed position, as shown in FIG. 2.

On upper surfaces of the opposite end portions 36a, 36a of the stopper piece 36, cutout portions 37, 37 are formed such that the opposite portions 36a, 36a are readily cut off.

Figure 4:
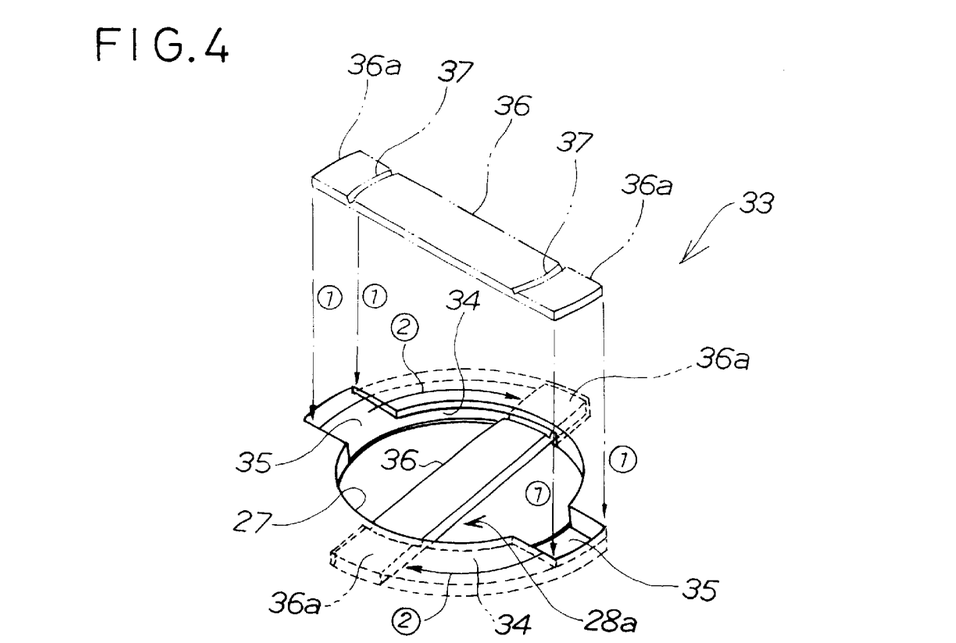
FIG. 4 shows how a lock means of the actuator is mounted in a cylinder portion of the actuator.

FIG. 4 illustrates how the opposite end portions 36a, 36a of the stopper 36 are mounted in the lock grooves 34, 34.

The substantially rectangular stopper piece 36 shown by a double-dot-and-dash line is lowered, as indicated by an arrow ①, and the opposite end portions 36a, 36a of the stopper 36 are thereby fitted into insertion openings 35, 35 formed in the lock grooves 34, 34. The stopper piece 36 is then rotated to move the opposite end portions 36a, 36a within the grooves 34, 34, as indicated by an arrow ②. The stopper piece 36 is thus mounted in the grooves 34, 34.

Discussion will be made next as to operation of the vehicular hood apparatus 20.

Referring back to FIG. 1, when the vehicle 10 hits the obstacle 18, the bumper sensor 38a, the floor sensor 38b, the vehicle speed sensor 38c detect the hitting of the vehicle 10 and then supply the control section 39 with the detecting signals indicative of the detection of the hitting of the vehicle 10. On the basis of the detecting signals from the respective sensors 38a, 38b, 38c, the control section 39 provides the inflator 30 (shown in FIG. 2) of the actuator 25 with the drive signal for driving the inflator 30. When the inflator 30 is driven by the drive signal, a gas-generating agent contained in the inflator 30 is ignited by means of an ignition device disposed in the inflator 30 to thereby generate a gas.

Figure 5A:
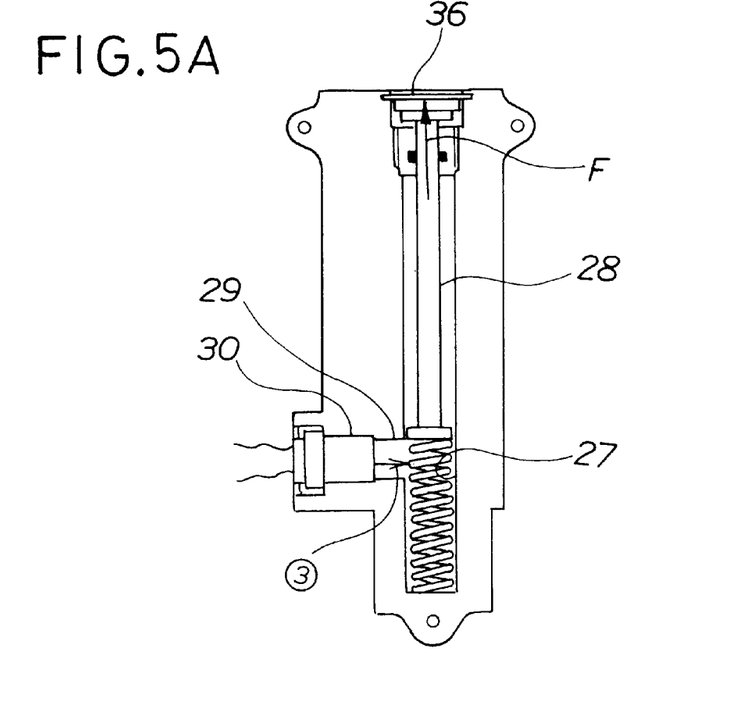
FIG. 5A shows a rod of the actuator subjected to a pushing force.
Figure 5B:
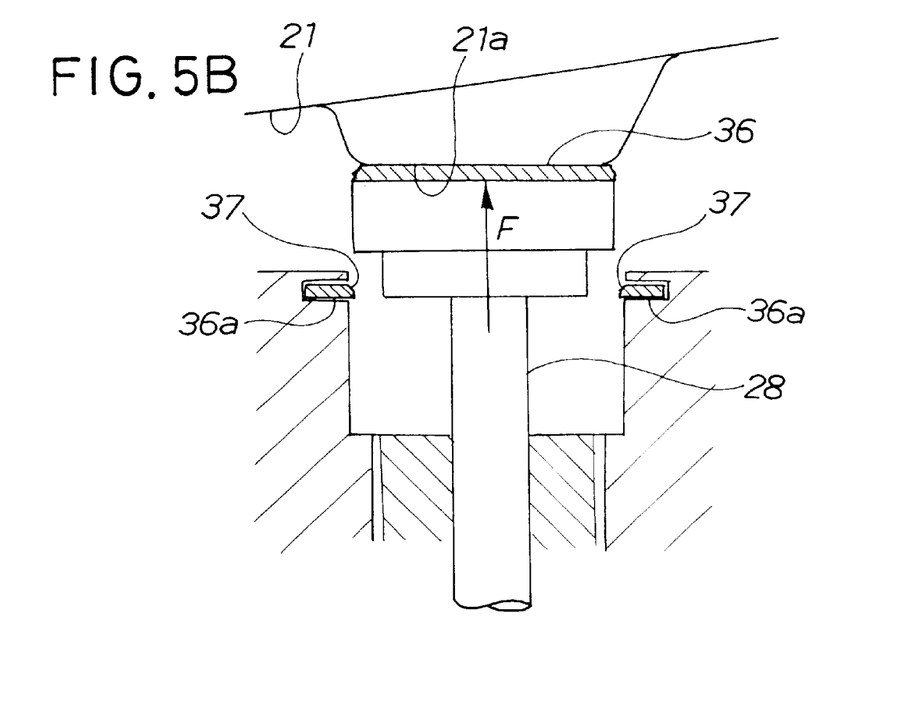
FIG. 5B is a view in which the rod is raised by the pushing force.

As shown in FIG. 5A, the gas generated by the inflator 30 is supplied via the communication aperture 29 to the cylinder portion 27, as indicated by an arrow ③. The gas thus supplied to the cylinder portion 27 produces and applies a pressure thereof to the piston rod 28. As a result, the pressure of the gas and a force produced by the spring 31 cooperate to provide a pushing force F. Such a pushing force F is applied to the piston rod 28, whereby the opposite portions 36a, 36a are cut off, as shown in FIG. 5B. The piston rod 28 is then raised to thereby push upwardly the projecting portion 21a of the hood 21.

The piston rod 28 is pushed upwardly to the uppermost position with the force F applied thereto, as shown in FIG. 6, thereby lifting the hood 21 a predetermined amount. Simultaneously, the lower link 43 and the upper link 45 are brought into alignment with each other. At this time, the spring 31 is extended to apply a spring force F1 to the piston rod 28. With the spring 31 thus arranged, the piston rod 28 can be held in the uppermost position. Thus, the piston rod 28 can hold the hood 21 lifted the predetermined amount, as shown in FIG. 6.

Because the spring 31 holds the piston rod 28 in the uppermost position to thereby hold the hood 21 in the lifted position, as described above, the link mechanism 40 is not required to hold the hood 21 in the lifted position. This simplifies the construction of the link mechanism 40.

Figure 7:
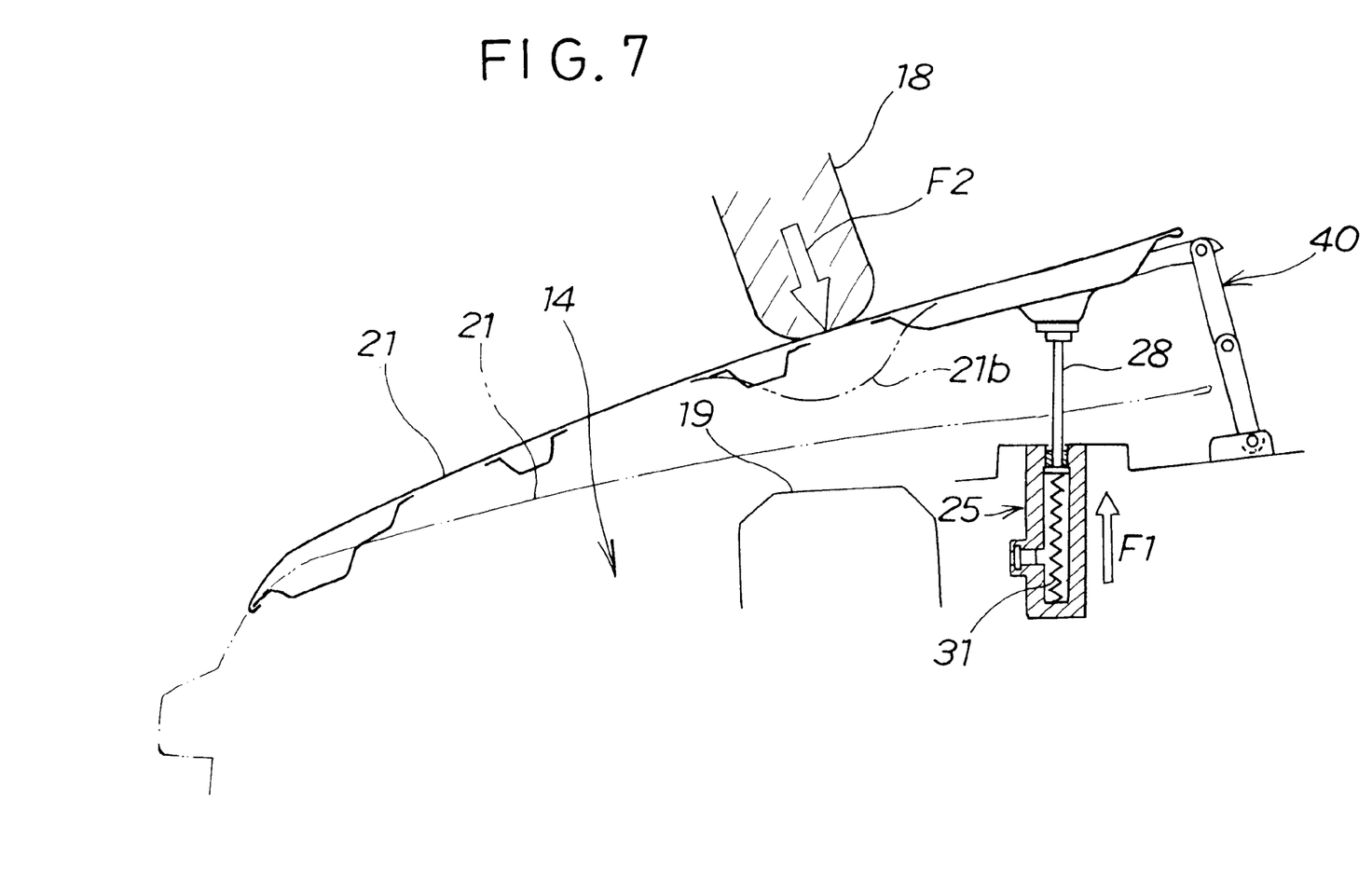
FIG. 7 is a view in which a hood of the apparatus shown in FIG. 1 absorbs impact of an obstacle thereon.

As shown in FIG. 7, the hood 21 is lifted the predetermined amount from a position shown by a double-dot-and-dash line to the lifted position shown by a solid line, in the manner as stated above. As a result, there is provided a large space between the hood 21 and a machine 19 such as an engine disposed within the engine room 14. The provision of the large space allows the hood 21 to greatly deform downwardly.

Since the spring 31 holds the piston rod 28 in the uppermost position, as mentioned above, the hood 21 is held in the lifted position even when the vehicle 10 hits the obstacle 18 and the obstacle 18 is thereby thrown onto the hood 21 to apply an external force F2 to the same. More specifically, upon the application of the force F2 to the hood 21, the hood 21 deforms to provide a large recessed portion 21b shown by a double-dot-and-dash line. Impact of the obstacle 18 on the hood 21 can therefore be absorbed.

In addition, even when the recessed portion 21b is formed in the above-mentioned manner, the hood 21 is not likely to abut on the machine 19 disposed within the engine room 14. The machine 19 can therefore be protected against impact of the obstacle 18 thereon.

Discussion will be made next as to vehicular hood apparatuses according to second and third embodiments of the present invention. The respective apparatuses in the second and third embodiments include parts corresponding to those previously described with reference to FIGS. 1 to 7. Such parts are denoted by the same reference numerals, and their description is omitted.

Figure 8:
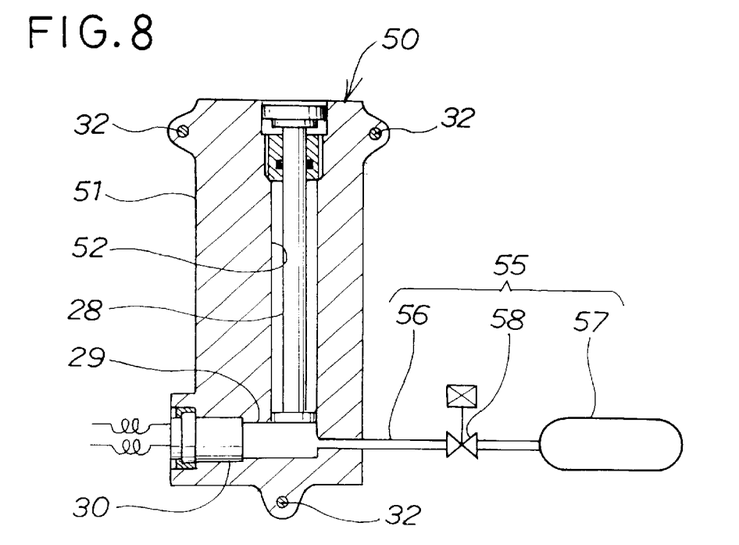
FIG. 8 is a cross-sectional view of an actuator of a vehicular hood apparatus according to a second embodiment of the present invention.

In FIG. 8, there is shown an actuator of the vehicular hood apparatus in the second embodiment of the present invention.

As shown in this figure, an actuator 50 includes an upwardly opened housing 51. The housing 51 forms therein a vertical cylinder portion 52 and a communication aperture 29 communicated with the cylinder portion 52. The actuator 50 includes the piston rod 28 for pushing the hood 21 upwardly. The piston rod 28 is reciprocally movably disposed in the cylinder portion 52. The actuator 50 has an inflator 30 disposed in the communication aperture 29. The actuator 50 also includes a rod retaining means 55 for holding the piston rod 28 in an uppermost position (shown in FIG. 9) when the piston rod 28 arrives in the uppermost position. The actuator 50 is attached to the frame 17 through the bolts 32, as is the housing 26 of the actuator 25 in the first embodiment of the present invention.

The rod retaining means 55 functions as a gas supplying section for supplying a space formed below the piston rod 28 with a gas having a high pressure for use in holding the piston rod 28 in the uppermost position. The rod retaining means employed in the second embodiment is hereinafter referred to as "the gas supplying section 55". The section 55 includes a flow path portion 56, a gas source 57, and an on-off valve 58 mounted to the flow path portion 56. The flow path portion 56 has an outlet port communicated with the cylinder portion 52 and an inlet post connected to the gas source 57.

The high pressure of the gas supplied from the section 55 acts to hold the piston rod 28 in the uppermost position. The gas supplying section 55 is connected to the actuator 50 through the flow path portion 56 thereof. In other words, the section 55 can be mounted outside the actuator 50. Thus, there is no need to mount the section 55 inside the actuator 50. The section 55 can therefore be easily mounted to the actuator 50 in a relatively short time.

Figure 9:
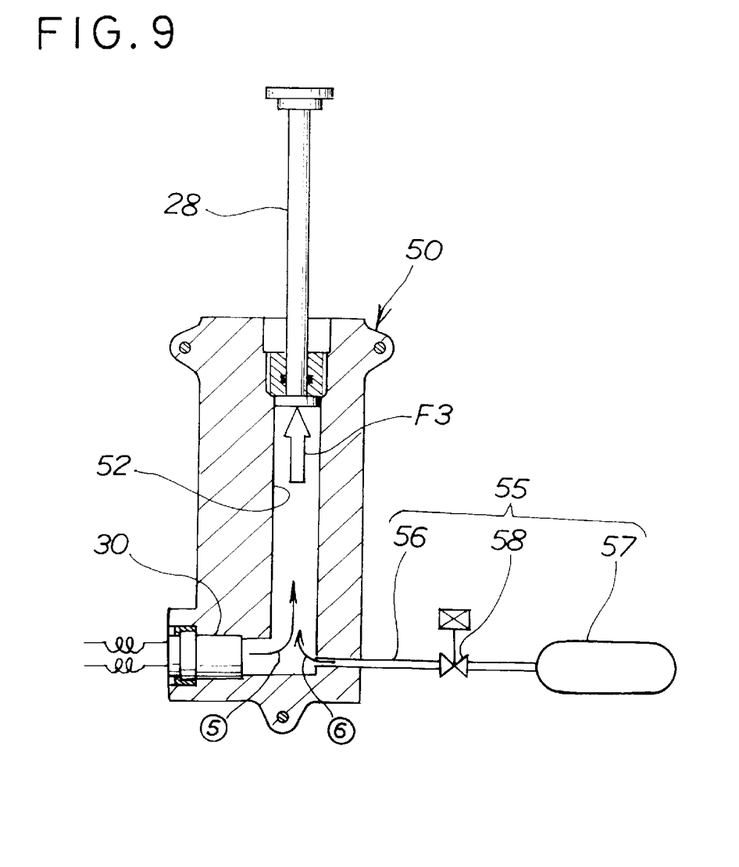
FIG. 9 is a view in which a rod of the actuator shown in FIG. 8 is held in an uppermost position.

Operation of the actuator of the vehicular hood apparatus in the second embodiment of the present invention will be described in relation to FIG. 9.

When the vehicle 10 hits the obstacle 18, the respective sensors 38a, 38b, 38c detect the hitting of the vehicle 10 and then supply the control section 39 with the detecting signals as previously described. On the basis of the detecting signals from the sensors 38a, 38b, 38c, the control section 39 provides the inflator 30 of the actuator 25 with the aforementioned drive signal. When the inflator 30 is driven by the drive signal, the gas-generating agent contained in the inflator 30 is ignited by means of the ignition device disposed in the inflator 30 to thereby generate a gas. The gas thus generated by the inflator 30 is supplied to the cylinder portion 52 as indicated by an arrow ⑤. A pressure of the gas is applied to the piston rod 28. The piston rod 28 is thus pushed upwardly to the uppermost position as shown in FIG. 9 to thereby lift the hood 21 a predetermined amount.

When the piston rod 28 arrives in the uppermost position, a sensor (not shown) provided in the apparatus detects the arrival of the piston rod 28 and then supplies the control section 39 with a detecting signal indicative of the arrival. On the basis of the detecting signal, the control section 39 provides the actuator 50 wit a signal for turning on the on-off valve 58. The gas source 57 then supplies the cylinder portion 52 with a gas having a high pressure, as indicated by an arrow ⑥. The high pressure of the gas is applied to the piston rod 28, as indicated by an arrow F3 to thereby hold the piston rod 28 in the uppermost position. With the thus arranged piston rod 28, the hood 21 lifted the predetermined amount can be held.

Therefore, the hood 21 thus held in a lifted position can be deformed to provide the large recessed portion 21b, thereby absorbing the impact of the obstacle 18 thereon in the manner as described with reference to FIG. 7. Since the large recessed portion 21b is not in abutment on the machine 19 disposed within the engine room 14, the machine 19 can be protected from the impact of the obstacle 18 thereon.

Figure 10:
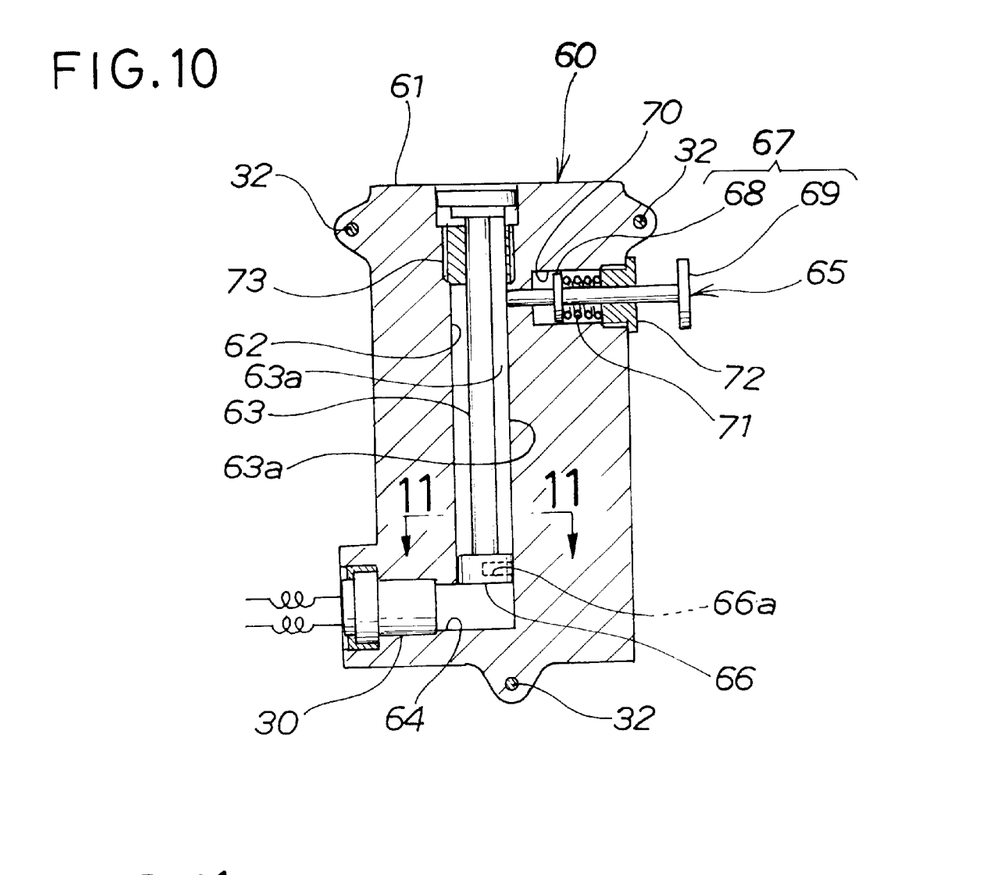
FIG. 10 is a cross-sectional view of an actuator of a vehicular hood apparatus according to a third embodiment of the present invention.

In FIG. 10, there is shown an actuator of a vehicular hood apparatus in the third embodiment of the present invention.

The actuator 60 includes an upwardly opened housing 61 forming therein a vertical cylinder portion 62 and a communication aperture 64 communicated with the cylinder portion 62. The actuator 60 includes a piston rod 63 for pushing the hood 21 upwardly. The piston rod 63 is reciprocally movably disposed in the cylinder portion 62. The actuator 60 has an inflator 30 disposed in the communication aperture 64. The actuator 60 also includes a rod retaining means 65 for holding the piston rod 63 in an uppermost position (shown in FIG. 12) when the piston rod 63 arrives in the uppermost position. The housing 61 is attached to the vehicle body frame 17 by means of bolts 32.

The piston rod 63 has a recessed portion 66a formed in a lower end portion 66 thereof. The rod retaining means 65 has a lock pin 67 to be fitted into the recessed portion 66a, a compression spring 71, and a nut 72. Formed in the housing 61 is a receiving hole 70 for accommodating therein the lock pin 67. The compression spring 71 urges the lock pin 67 towards the recessed portion 66a. The nut 72 retains the spring 71 within the hole 70.

Since the recessed portion 66a is formed in the piston rod 63 while the lock pin 67 and the compression spring 71 etc. are provided in the housing 61 as stated above, it is not necessary for the lock pin 67 and the compression spring 71 etc. to be mounted to the relatively slim piston rod 63. Thus, the lock pin 67 can be readily mounted in a relatively short time.

The lock pin 67 has a flange 68 formed distally thereof. Formed proximally of the lock pin 67 is a handle 69 for use in pulling the lock pin 67. The flange 68 is pressed against the spring 71. The spring 71 acts to insert the lock pin 67 into the recessed portion 66a. Pulling the handle 69 causes the lock pin 67 to move out of the recessed portion 66a.

Figure 11:
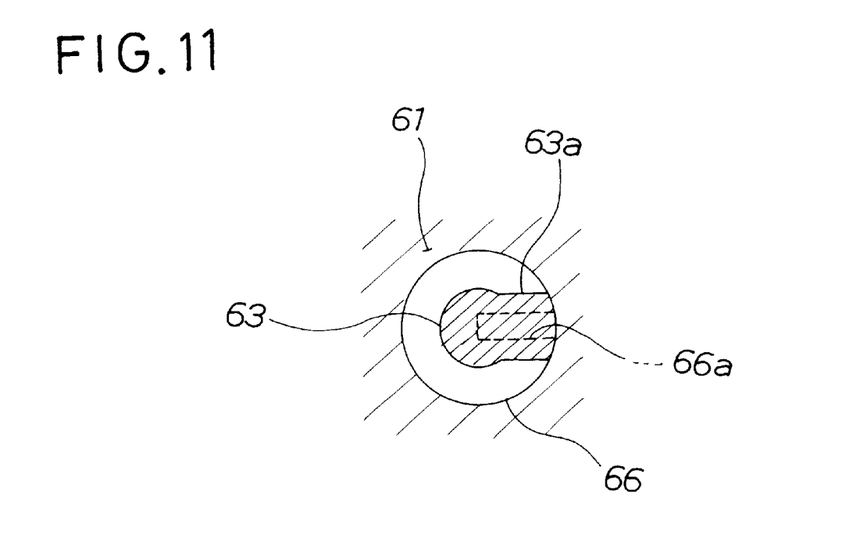
FIG. 11 is a cross-sectional view taken along line 11—11 of FIG. 10.

FIG. 11 is a cross-sectional view taken along line 11—11 of FIG. 10.

The piston rod 63 includes a guide 63a. The guide 63a is slidably inserted through a stopper 73 (shown in FIG. 10). The recessed portion 66a extends in parallel to the lock pin 67. With this arrangement, the lock pin 67 is disposed to be fitted into the recessed portion 66a when the piston rod 63 is raised to the uppermost position.

Figure 12:
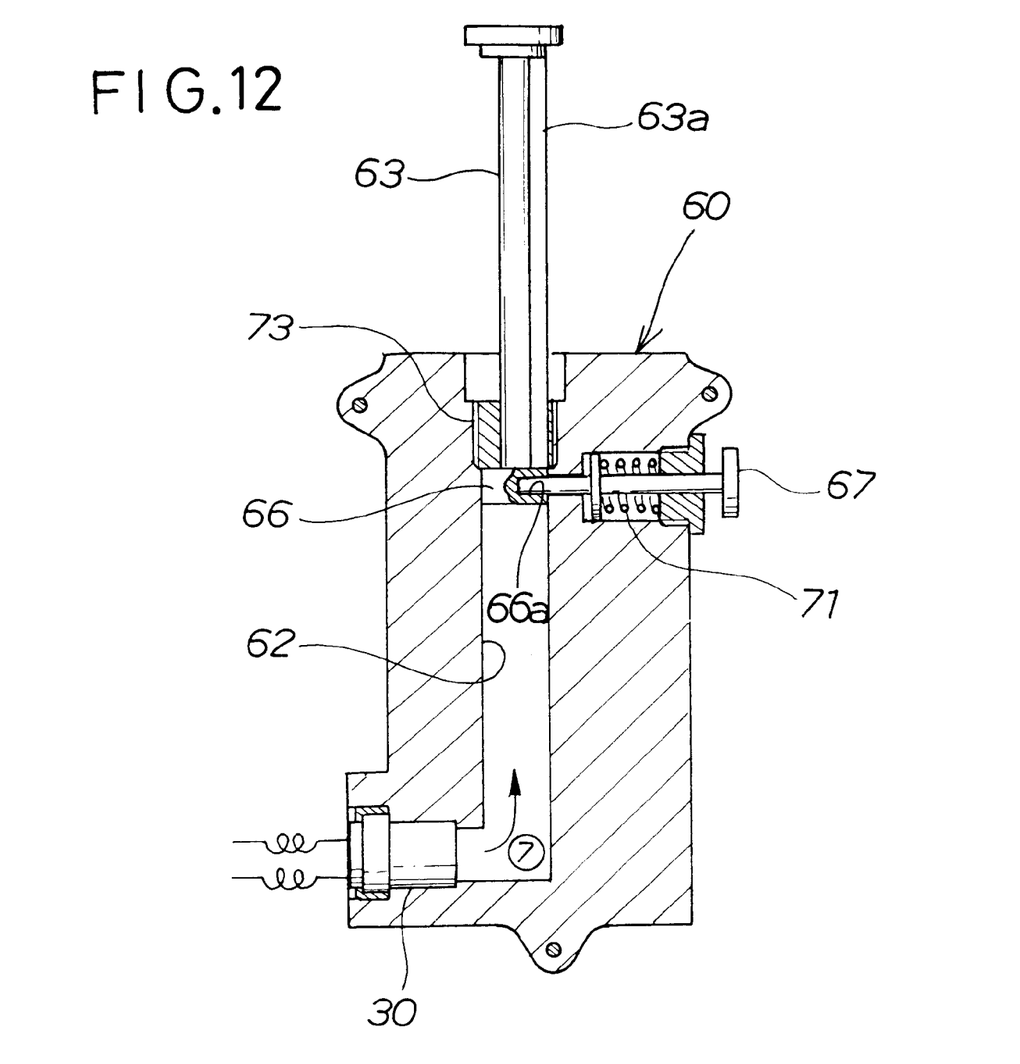
FIG. 12 is a view in which a rod of the actuator shown in FIG. 10 is held in an uppermost position.

Operation of the actuator of the apparatus in the third embodiment of the present invention will discussed with reference to FIG. 12.

When the vehicle 10 hits the obstacle 18, the inflator 30 of the actuator 60 is supplied with the drive signal in the manner as previously described with reference to FIG. 9. The gas-generating agent of the inflator 30 is then ignited by means of the ignition device disposed in the inflator 30 to thereby generate a gas. The gas thus generated is supplied to the cylinder portion 62 as indicated by an arrow ⑦. Since the pressure of the gas is applied to the piston rod 63, the piston rod 63 is pushed upwardly to the uppermost position to thereby lift the hood 21 a predetermined amount.

When in the uppermost position, the piston rod 63 has the recessed portion 66a aligned with the lock pin 67. The spring 71 acts to fit a distal end portion of the lock pin 67 into the recessed portion 66a. As a result, the piston rod 63 is held in the uppermost position to thereby hold the hood lifted the predetermined amount.

The hood 21 thus held in a lifted position can be deformed to provide the large recessed portion 21b, thereby absorbing the impact of the obstacle 18 thereon in the manner as described in relation to FIG. 7. The large recessed portion 21b is not in abutment on the machine 19 disposed in the engine room 14, and therefore the machine can be protected from the impact of the obstacle 18 on the hood 21.

The vehicle body frame has the actuator and the link mechanism provided both rightwardly and leftwardly thereof. However, it may be altered to have the actuator and link mechanism provided either rightwardly or leftwardly thereof. In such a case, the number of parts of the actuators and link mechanisms to be mounted on the vehicle can be made small to thereby reduce the cost thereof.

Although the actuator is provided on the side of the vehicle body frame, it may be provided on the side of the hood.

The compression spring 31 has been described which holds the hood in the lifted position when the vehicle hits the obstacle. However, the compression spring may have a spring modulus selected to contract to thereby effectively reduce the impact of the obstacle 18 on the hood.

The first embodiment has been described as being applied to the lock means compressing and retaining the compression spring within the cylinder portion. However, another means may be used for compressing and retaining the spring within the cylinder portion.

The second embodiment employs the gas supplying section as the rod retaining means. However, the inflator 30 may be designed to cause a gas to jet for a fixed period of time to lift the piston rod 30 to the uppermost position and subsequently hold the piston rod 28 in the uppermost position.

Obviously, various minor changes and modifications of the present invention are possible in the light of the above teaching. It is therefore to be understood that within the scope of the appended claims, the present invention may, be practiced otherwise than as specifically described.

What is claimed is:

1. A vehicular hood apparatus comprising a hood provided on a front part of a vehicle, and an actuator, wherein said actuator lifts said hood a predetermined amount when the vehicle hits an obstacle, said actuator including a housing and a rod for pushing said hood upwardly, and a rod retaining means positioned below said rod and serving to hold said rod in an uppermost position when said rod arrives in the uppermost position, said housing including a communication aperture, said actuator including an inflator mounted in said communication aperture.

2. The vehicular hood apparatus of claim 1 wherein said rod retaining means includes a gas supplying section, said gas supplying section serving to supply a space formed below said rod with a gas having a high pressure.

3. The vehicular hood apparatus of claim 1 wherein said rod retaining means includes a lock pin, said rod having a recessed portion formed therein, said lock pin being disposed to fit into said recessed portion so as to hold said rod in the uppermost position when said rod arrives in the uppermost position.

4. The vehicular hood apparatus of claim 1 wherein said rod retaining means includes a compression spring.

* * * * *